US011841473B1

(12) United States Patent
Mohideen

(10) Patent No.: US 11,841,473 B1
(45) Date of Patent: Dec. 12, 2023

(54) SEISMIC WEIGHT DROPPER ARRANGEMENT FOR A DRONE

(71) Applicant: Farlin Anooz Mohideen, Belmont (AU)

(72) Inventor: Farlin Anooz Mohideen, Belmont (AU)

(*) Notice: Subject to any disclaimer, the term of this patent is extended or adjusted under 35 U.S.C. 154(b) by 0 days.

(21) Appl. No.: 18/251,507

(22) PCT Filed: Aug. 5, 2022

(86) PCT No.: PCT/AU2022/050851
§ 371 (c)(1),
(2) Date: May 2, 2023

(87) PCT Pub. No.: WO2023/035024
PCT Pub. Date: Mar. 16, 2023

(30) Foreign Application Priority Data

Sep. 7, 2021 (AU) .................................. 2021902890

(51) Int. Cl.
| | |
|---|---|
| *G01V 1/09* | (2006.01) |
| *G01V 1/147* | (2006.01) |
| *B64U 10/00* | (2023.01) |
| *B64D 1/02* | (2006.01) |
| *B64U 101/60* | (2023.01) |

(52) U.S. Cl.
CPC .................. *G01V 1/09* (2013.01); *B64D 1/02* (2013.01); *B64U 10/00* (2023.01); *G01V 1/147* (2013.01); *B64U 2101/60* (2023.01); *G01V 2210/1295* (2013.01)

(58) Field of Classification Search
CPC .. G01V 1/09; G01V 1/147; G01V 2210/1295; B64D 1/02; B64U 10/00; B64U 2101/60
See application file for complete search history.

(56) References Cited

U.S. PATENT DOCUMENTS 2,897,907 A * 8/1959 Blount .................... E02D 3/046
404/133.05
3,542,151 A * 11/1970 Hamilton ............... G01V 1/147
181/114

(Continued)

FOREIGN PATENT DOCUMENTS

CN  202631745 U  * 12/2012
WO  WO-2022176717 A1 * 8/2022

(Continued)

*Primary Examiner* — Daniel Pihulic
(74) *Attorney, Agent, or Firm* — TraskBritt

(57) ABSTRACT

A seismic weight dropper arrangement for a drone. The arrangement comprises a winch assembly attachable to a drone and comprising an actuator and spool with a cable windable thereon. Arrangement also includes a seismic source assembly comprising a housing and a mass suspended within the housing via at least one resiliently elastic biasing element, such as a coil spring. The seismic source assembly is fast with the cable and the actuator configured selectively to eject the seismic source assembly from the drone under the influence of gravity. The resiliently elastic biasing element has a predetermined modulus of elasticity to facilitate the mass impacting the housing when the housing impacts a surface after such ejection from a predetermined height above the surface.

16 Claims, 4 Drawing Sheets

(56) References Cited

U.S. PATENT DOCUMENTS

| | | | | |
|---|---|---|---|---|
| 6,056,237 A | * | 5/2000 | Woodland | F42B 12/365 |
| | | | | 244/49 |
| 10,071,804 B1 | | 9/2018 | Buchmueller et al. | |
| 2009/0260804 A1 | * | 10/2009 | Mydur | E21B 7/02 |
| | | | | 166/250.01 |
| 2014/0307525 A1 | * | 10/2014 | Postel | G01V 1/24 |
| | | | | 367/37 |
| 2021/0116590 A1 | | 4/2021 | Qian et al. | |

FOREIGN PATENT DOCUMENTS

| | | | |
|---|---|---|---|
| WO | WO-2023015334 A1 | * | 2/2023 |
| WO | WO-2023023697 A1 | * | 3/2023 |
| WO | WO-2023035024 A1 | * | 3/2023 |

\* cited by examiner

SEISMIC WEIGHT DROPPER ARRANGEMENT FOR A DRONE

CROSS-REFERENCE TO RELATED APPLICATIONS

This application is a national phase entry under 35 U.S.C. § 371 of International Patent Application PCT/AU2022/050851, filed Aug. 5, 2022, designating the United States of America and published as International Patent Publication WO 2023/035024 A1 on Mar. 16, 2023, which claims the benefit under Article 8 of the Patent Cooperation Treaty to Australian Patent Application Serial No. 2021902890, filed Sep. 7, 2021.

TECHNICAL FIELD

This disclosure broadly relates to the field of geophysics and seismic surveying and more specifically to a seismic weight dropper arrangement for a drone, a drone for seismic surveying and an associated method of seismic surveying.

BACKGROUND

The following discussion of the background art is intended to facilitate an understanding of the disclosure only. The discussion is not an acknowledgement or admission that any of the material referred to is or was part of the common general knowledge as at the priority date of the disclosure.

Technologies for deployment of instruments have been developed, such as geophones, by means of drones, as described in International Patent Application nos. PCT/AU2022/050785 and PCT/AU2022/050847. Such technologies find particular application in the autonomous dispersal and installation of geophones across an area for seismic surveying, or the like.

As known in the art of seismic surveying, a so-called seismic source is a device that generates controlled seismic energy used to perform both reflection and refraction seismic surveys. A seismic source can be simple, such as an explosive charge, or it can use more sophisticated technology, such as a specialized air gun or a weight dropper.

Seismic sources are generally used to generate seismic waves, which travel through the earth. Some of the waves then reflect and refract and are recorded by receivers, such as geophones.

Seismic sources may be used to investigate shallow subsoil structure, for engineering site characterization, or to study deeper structures, such as in the search for petroleum and mineral deposits, or to map subsurface faults or for other scientific investigations. The returning signals from the sources are detected by seismic sensors (geophones or hydrophones) in known locations relative to the position of the source. The recorded signals are then subjected to specialist processing and interpretation to yield comprehensible information about the subsurface.

The current disclosure was conceived as part of a suite of drone-based survey technologies, particularly to provide a suitable weight dropper seismic source, which is re-useable, configurable and drone-portable and manageable.

BRIEF SUMMARY

The skilled addressee is to appreciate that, while a primary implementation of the arrangement described herein will be via drone, i.e., unmanned aerial vehicle, the arrangement may also be adapted for use with manned aircraft. Similarly, reference herein to a "drone" broadly includes reference to any suitable unmanned aerial vehicle that may be guided remotely and/or operate autonomously to reach a particular geographic location with a predetermined load or cargo, such as a multi-copter, or the like.

According to a first aspect of the disclosure there is provided a seismic weight dropper arrangement for a drone, the arrangement comprising:
a winch assembly attachable to a drone and comprising an actuator and spool with a cable windable thereon; and
a seismic source assembly comprising a housing and a mass suspended within the housing via at least one resiliently elastic biasing element;
wherein the seismic source assembly is fast with the cable and the actuator configured selectively to eject the seismic source assembly from the drone under the influence of gravity, and wherein the resiliently elastic biasing element has a predetermined modulus of elasticity to facilitate the mass impacting the housing when the housing impacts a surface after such ejection from a predetermined height above the surface.

In an embodiment, the winch assembly is arranged in signal communication with a controller of the drone, wherein the controller is able to control the actuator.

In an embodiment, the winch assembly is attachable to the drone so that the winch assembly is suspended below such drone to facilitate unimpeded ejection of the seismic source assembly under the influence of gravity.

In an embodiment, the actuator comprises an electromechanical actuator, such as an electrical motor, for operatively rotating the spool in order to wind the cable onto the spool.

In an embodiment, the actuator includes a gearing arrangement to facilitate torque transfer between the actuator and spool.

In an embodiment, the winch assembly comprises a clutch or brake to control rotation of the spool, as desired.

In an embodiment, the seismic source assembly includes an impact surface at a bottom thereof.

In an embodiment, the housing comprises a metallic housing.

In an embodiment, the mass comprises a predetermined mass.

In an embodiment, the housing and mass are configured to minimize lateral movement of the mass within the housing.

In an embodiment, the resiliently elastic biasing element comprises a spring.

In an embodiment, the modulus of elasticity is predetermined to facilitate repeated impacts of the mass on the housing when the housing impacts the surface.

In an embodiment, the arrangement includes a lock assembly configured to releasably and selectively lock the seismic source assembly to the winch assembly.

In an embodiment, the lock assembly comprises at least one solenoid lock under control of the controller.

According to a second aspect of the disclosure there is provided a drone configured for seismic surveying, the drone having a controller and comprising:
a winch assembly attached to the drone and comprising an actuator and spool with a cable windable thereon; and
a seismic source assembly comprising a housing and a mass suspended within the housing via at least one resiliently elastic biasing element;
wherein the seismic source assembly is fast with the cable and the actuator is configured selectively to eject the seismic source assembly from the drone under the influence of gravity, and wherein the resiliently elastic biasing element has a predetermined modulus of elasticity to facilitate the mass impacting the housing when the housing impacts a surface after such ejection from a predetermined height above the surface.

Typically, the winch assembly is arranged in signal communication with the controller of the drone so that the controller is able to control the actuator.

In an embodiment, the winch assembly is attachable to the drone so that the winch assembly is suspended below such drone to facilitate unimpeded ejection of the seismic source assembly under the influence of gravity.

In an embodiment, the actuator comprises an electromechanical actuator, such as an electrical motor, for operatively rotating the spool in order to wind the cable onto the spool.

In an embodiment, the actuator includes a gearing arrangement to facilitate torque transfer between the actuator and spool.

In an embodiment, the winch assembly comprises a clutch or brake to control rotation of the spool, as desired.

In an embodiment, the seismic source assembly includes an impact surface at a bottom thereof.

In an embodiment, the housing comprises a metallic housing.

In an embodiment, the mass comprises a predetermined metallic mass.

In an embodiment, the housing and mass are configured to minimize lateral movement of the mass within the housing.

In an embodiment, the resiliently elastic biasing element comprises a spring.

In an embodiment, the modulus of elasticity is predetermined to facilitate repeated impacts of the mass on the housing when the housing impacts the surface.

In an embodiment, the arrangement includes a lock assembly configured to releasably and selectively lock the seismic source assembly to the winch assembly.

In an embodiment, the lock assembly comprises at least one solenoid lock under control of the controller.

According to a third aspect of the disclosure there is provided a method of seismic surveying, the method comprising the steps of:
providing a drone in accordance with the second aspect of the disclosure;
selectively ejecting the seismic source assembly from the winch assembly when the drone is at a predetermined height above a surface so that the housing impacts the surface; and
taking seismic measurements.

According to a further aspect of the disclosure there is provided a seismic weight dropper arrangement for a drone, a drone, and an associated method of seismic surveying, substantially as herein described and/or illustrated.

BRIEF DESCRIPTION OF THE DRAWINGS

The description will be made with reference to the accompanying drawings in which.

DETAILED DESCRIPTION

Figure 1:
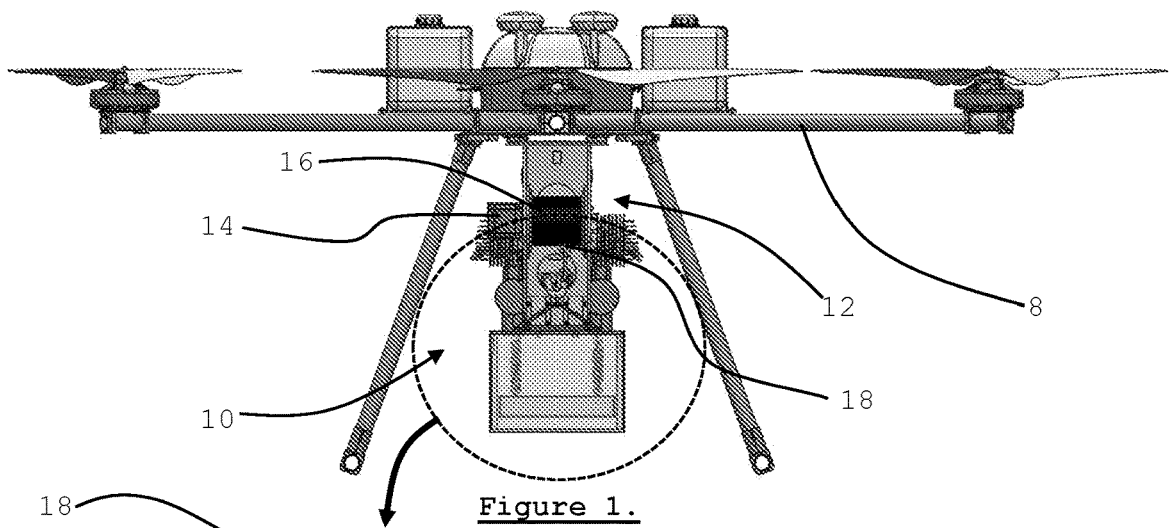
FIG. 1 is a diagrammatic front-view representation of a seismic weight dropper arrangement for a drone, in accordance with an aspect of the disclosure.
Figure 2:
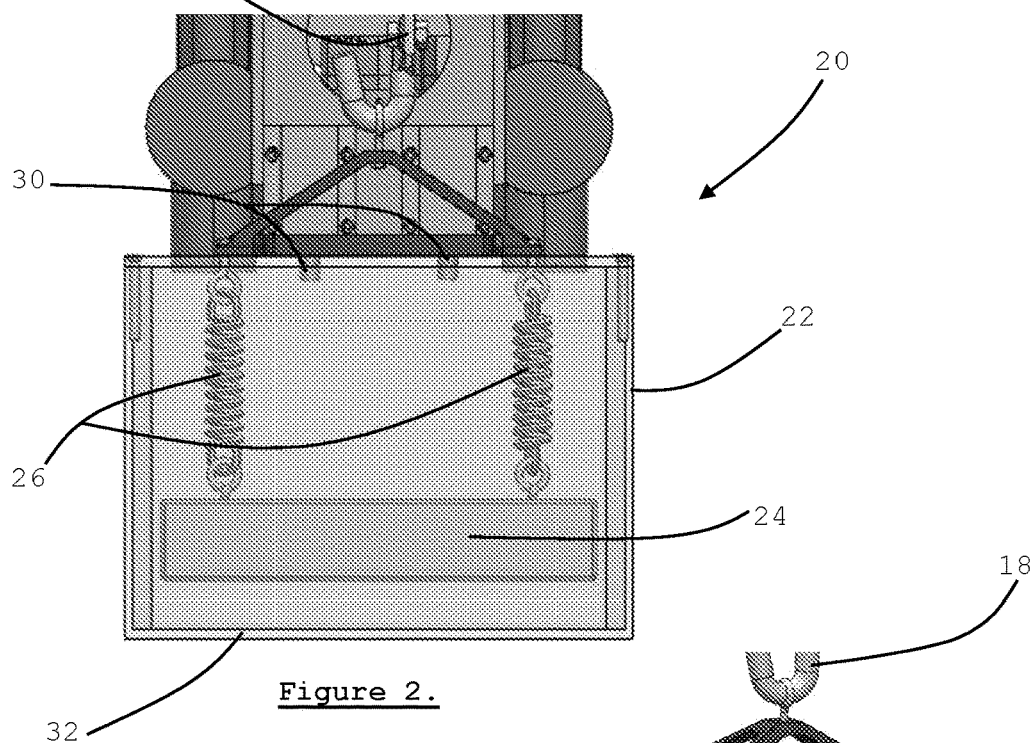
FIG. 2 is a diagrammatic closer-view representation of a seismic source assembly of the weight dropper arrangement of FIG. 1.
Figure 3:
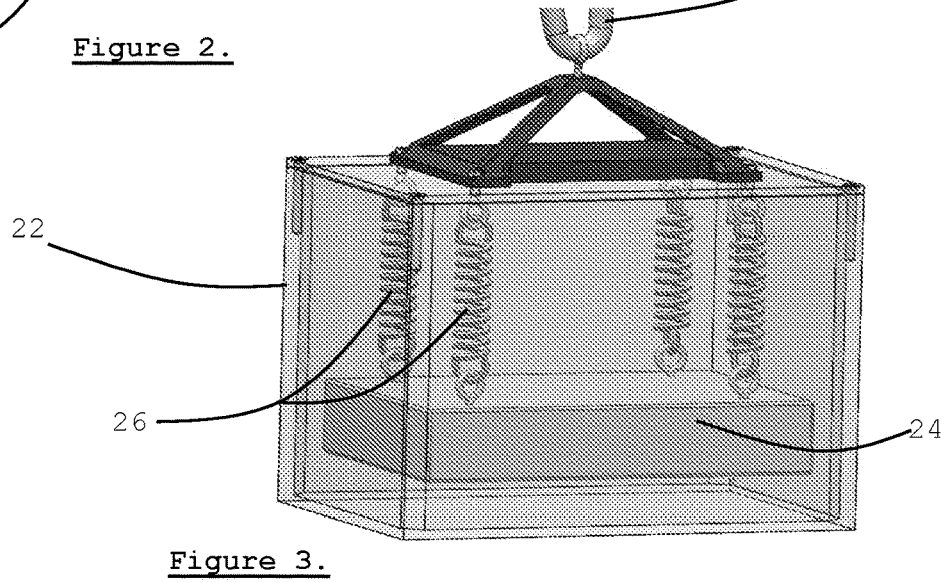
FIG. 3 is diagrammatic perspective-view representation of a housing of the seismic source assembly of the weight dropper arrangement of FIG. 1.
Figure 4:
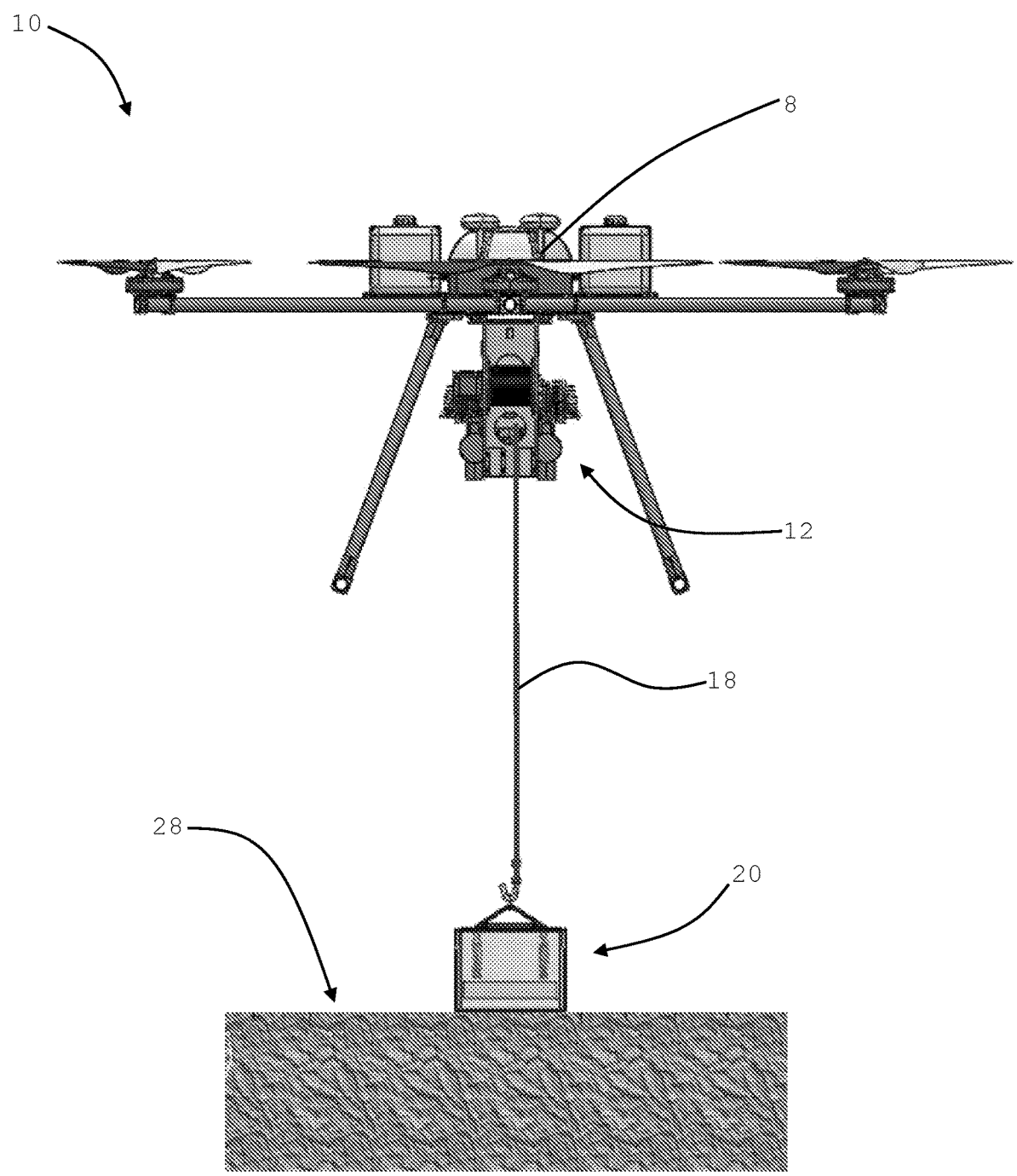
FIG. 4 is a diagrammatic front-view representation of a drone using the seismic weight dropper arrangement of FIG. 1, in accordance with an aspect of the disclosure.
Figure 5:
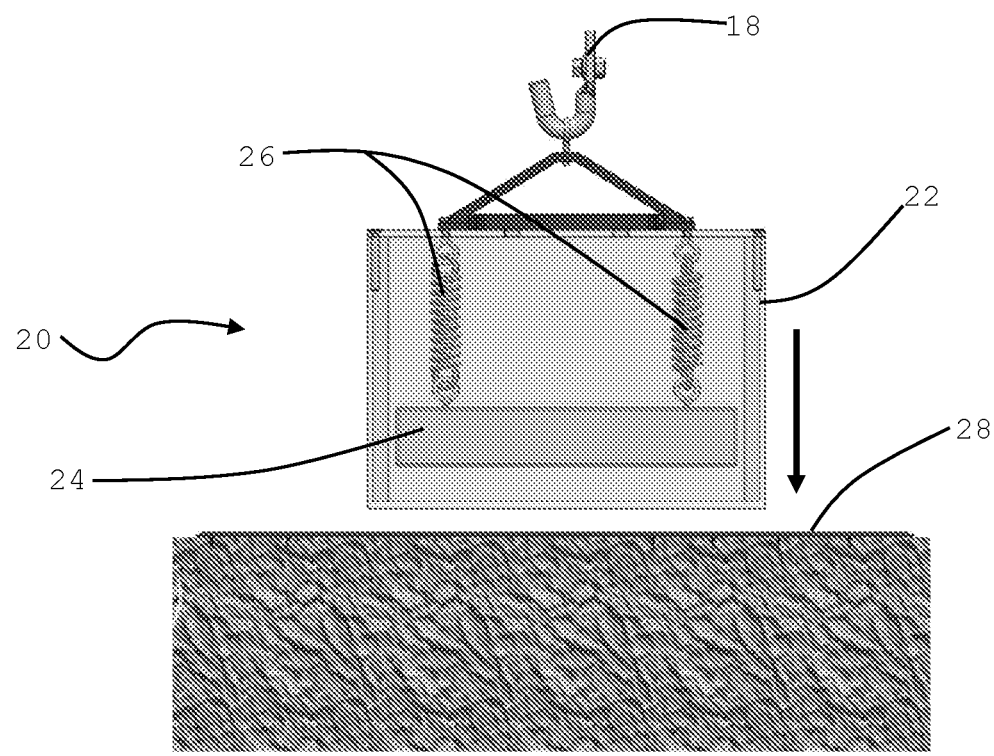
FIG. 5 is a diagrammatic front-view representation of the seismic source assembly just before impacting a surface.
Figure 6:
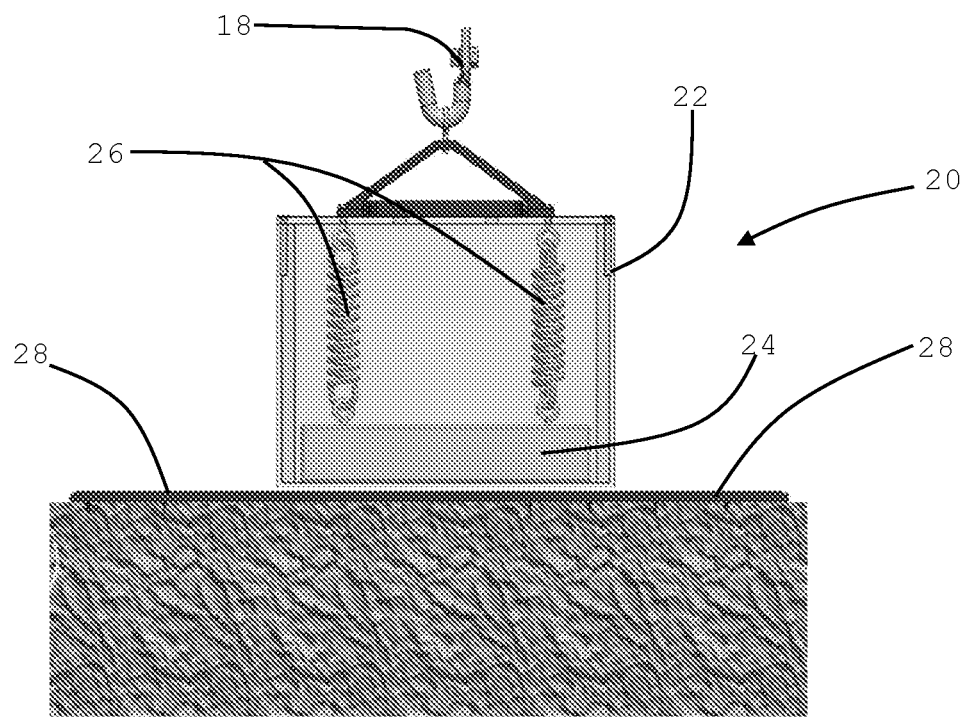
FIG. 6 is a diagrammatic front-view representation of the seismic source assembly of FIG. 5 impacting a surface.

Further features of the disclosure are more fully described in the following description of several non-limiting embodiments thereof. This description is included solely for the purposes of exemplifying the disclosure to the skilled addressee. It should not be understood as a restriction on the broad summary, disclosure or description of the disclosure as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee.

Figure 7:
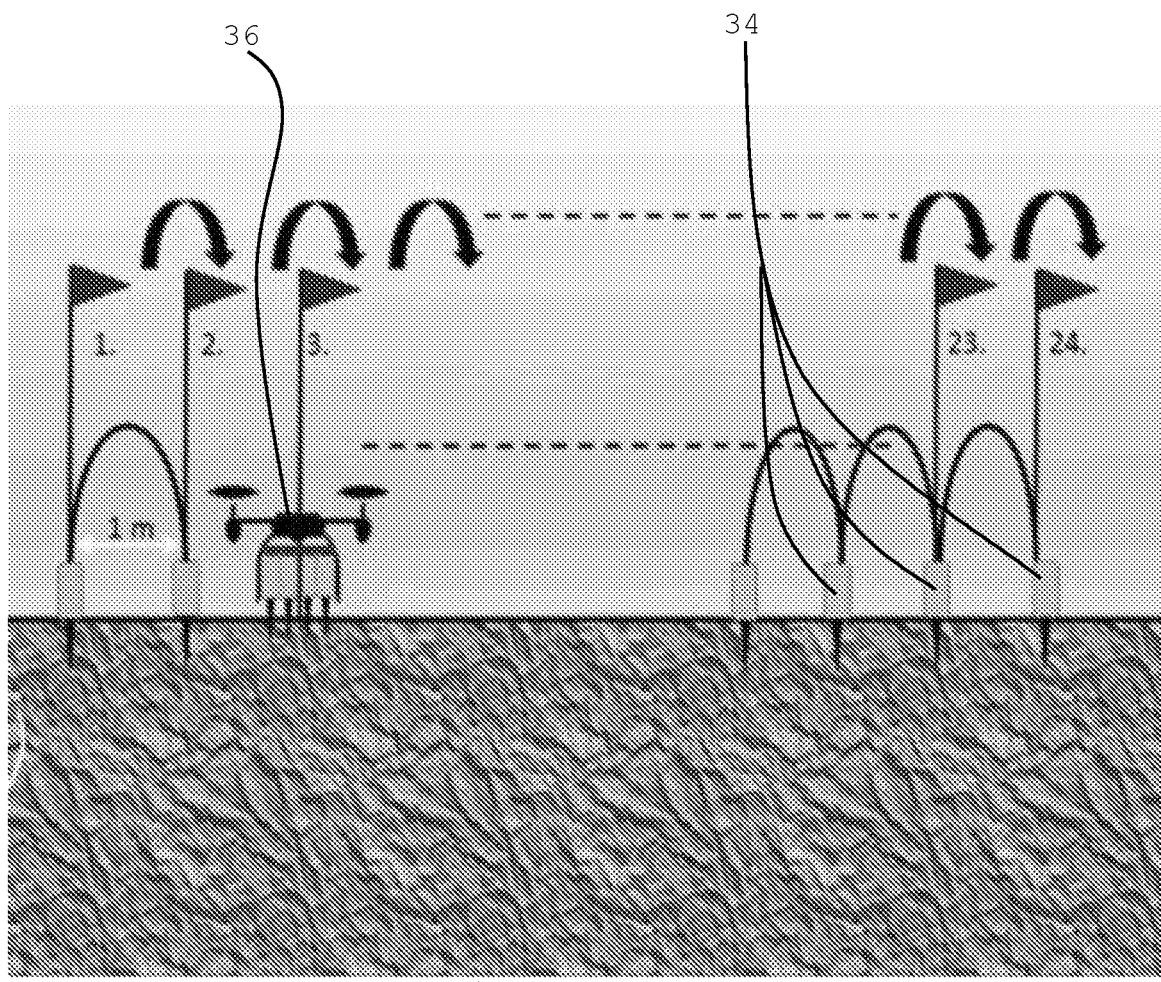
FIG. 7 is a diagrammatic representation of a geophone array installed via drone in which the seismic weight dropper arrangement of FIG. 1 finds particular application.

The disclosure broadly provides for a seismic weight dropper arrangement 10 for a drone 8, as well as such a drone 8 fitted with arrangement 10. The arrangement generally includes a winch assembly 12 and a seismic source assembly 20, as described below. Arrangement 10 finds particular application in providing an autonomous means whereby a seismic source in the form of a weight dropper can be provided to an array of geophones 34 (as shown in FIG. 7).

As described in International Patent Application nos. PCT/AU2022/050785 and PCT/AU2022/050847, geophones 34 can be autonomously deployed by means of drones 36 for conducting seismic surveys. The arrangement 10 of the disclosure is able to function as a controllable and configurable seismic source to facilitate such seismic surveys according to requirements.

Importantly, the skilled addressee is to appreciate that due to typical size and weight limitations in payload capacity for most drones, the arrangement 10 includes a specifically-configured seismic source assembly 20 of manageable size and weight for a drone, whilst being able to serve as a reliable and useful seismic source.

The seismic weight dropper arrangement 10 of the disclosure typically comprises a winch assembly 12, which is operatively attachable to a drone 8. The winch assembly 12, in turn, comprises an actuator 14 and a suitable spool 16 with a cable 18 windable thereon. The skilled addressee is to appreciate that such a cable 18 may take various forms, including wire, rope, line, etc.

Typically, the winch assembly 12 is arranged in signal communication with a controller (not shown) of the drone 8 so that such a controller is able to control the actuator 14, as required. Such an actuator 14 may take various forms, requirements depending, but typically comprises an electromechanical actuator, such as an electrical motor, for operatively rotating the spool 16 in order to wind the cable 18 onto the spool 16. The actuator 14 may also include a gearing arrangement (not shown) to facilitate torque transfer between the actuator 14 and spool 16.

In one embodiment, the winch assembly 12 further comprises a clutch and/or brake to control rotation of the spool 16, as desired. For example, such a clutch and/or brake can be used to release or eject the seismic source assembly 20, as described in more detail below.

In the exemplified embodiment, the winch assembly 12 is attachable to the drone 8 so that the winch assembly 12 is suspended below the drone 8 to facilitate unimpeded ejection of the seismic source assembly 20 under the influence of gravity. Of course, variations hereon are possible and anticipated.

The seismic source assembly 20 broadly comprises a housing 22 and a mass 24 suspended within the housing 22 via at least one resiliently elastic biasing element 26. The resiliently elastic biasing element 26 typically comprises a coil spring, or the like, but variations hereon are possible and within the scope of the disclosure. In the exemplified embodiment, mass 24 is suspended within housing 22 by means of four springs, as shown, but variations are possible.

In one embodiment, the housing 22 comprises a metallic housing, but such a configuration is non-limiting. Similarly, in one embodiment the mass 24 comprises a predetermined metallic mass, but variations are possible. In the exemplified embodiment, the housing 22 and mass 24 are configured via suitable shape and dimensions to minimize lateral movement of the mass 24 within the housing 22, i.e., the mass 24 is generally free to move up and down within the housing 22, rather than side to side. The housing 22 may also include an impact surface 32 at a bottom thereof, either internally and/or externally.

The skilled addressee is to appreciate that the resiliently elastic biasing element 26 is configured or selected to have a predetermined modulus of elasticity, i.e., Young's modulus, to facilitate the mass 24 impacting the housing 22 when the housing 22 is dropped and impacts a surface 28 after such ejection from a predetermined height above the surface 28. In one embodiment, the modulus of elasticity is predetermined to facilitate repeated impacts of the mass 24 against the housing 22 when the housing 22 impacts the surface 28. In this manner, the impact of the mass 24 against the housing 22 provides a seismic source for seismic surveying.

Importantly, such specific configuration of the seismic source assembly 20 having the housing 22 with the mass 24 suspended within the housing 22 via at least one resiliently elastic biasing element 26 having a predetermined modulus of elasticity provides for a drone-portable and manageable seismic source, which is also re-useable as a drone moves to different areas, whilst also being enabled to provide configurable seismic impacts to facilitate surveying.

For example, via suitable selection of the housing 22 material, size and weight, mass 24 material, size and weight, along with the modulus of elasticity of the element(s) 26, it is possible to configure a seismic source of known magnitude when released from a specific height by the drone 8. Additionally, via suitable configuration, the mass 24 may also strike the housing 22 a predetermined number of times and at predetermined magnitudes at impact, thereby allowing repeatable and accurate seismic surveying over an area. Additionally, such specific and configurable aspects of the seismic source assembly 20 allows seismic surveying to be performed in manners not possible via conventional methods.

In one embodiment, the arrangement 10 also includes a lock assembly 30, which is configured to releasably and selectively lock the seismic source assembly 20 to the winch assembly 12. In the exemplified embodiment, the lock assembly 30 comprises at least one solenoid lock under control of the controller.

Importantly, in use, the arrangement 10 features the seismic source assembly 20 fast with the cable 18 of the winch assembly 12, with the actuator 14 configured selectively to eject the seismic source assembly 20 from the drone 8 under the influence of gravity. For example, via selective release of a suitable brake and/or clutch and disengagement of the lock assembly 30, the seismic source assembly 20 can be ejected under the influence of gravity, i.e., dropped, when the drone is at a predetermined height above surface 28.

The disclosure also broadly provides for an associated method of seismic surveying. Such a method typically comprises the steps of providing a drone 8 fitted with arrangement 10, selectively ejecting the seismic source assembly 20 from the winch assembly 12 when the drone 8 is at a predetermined height above a surface 28 so that the housing 22 impacts the surface 28, causing the mass 24 to impact the housing 22, and taking seismic measurements.

In the manner described, a drone 8 is able to autonomously perform seismic surveying by ascending to a specific height above a surface 28, e.g., 50 m, ejecting or releasing the seismic source assembly 20 to fall under the influence of gravity so that mass 24 impacts the housing 22 when the housing impacts the surface 28, thereby providing a seismic source, as required.

It is believed to be particularly advantageous that the disclosure provides for arrangement 10 able to facilitate automated seismic surveying by providing a seismic source deployable, as required, via a drone. Additionally, the configurable seismic source assembly 20 of arrangement 10 allows a drone-portable and manageable seismic source, which is also re-useable over an area, as required. Seismic source assembly 20 is further configurable to provide specific and predetermined impact magnitudes and number of impacts, thereby enabling accurate seismic surveying to be conducted.

Optional embodiments of the disclosure may also be said to broadly consist in the parts, elements and features referred to or indicated herein, individually or collectively, in any or all combinations of two or more of the parts, elements or features, and wherein specific integers are mentioned herein, which have known equivalents in the art to which the disclosure relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the disclosure, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the disclosure, whilst other aspects are exemplified in a different example. These examples are intended to assist the skilled person in performing the disclosure and are not intended to limit the overall scope of the disclosure in any way unless the context clearly indicates otherwise. Variations (e.g., modifications and/or enhancements) of one or more embodiments described herein might become apparent to those of ordinary skill in the art upon reading this disclosure. Skilled artisans are expected to employ such variations as appropriate, and it is intended for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A seismic weight dropper arrangement for a drone, comprising:
   a winch assembly attachable to the drone and comprising an actuator and spool with a cable windable thereon; and
   a configurable seismic source assembly comprising:
      a housing; and
      a mass suspended within the housing via at least one resiliently elastic biasing element having a predetermined modulus of elasticity to facilitate the mass impacting the housing with predetermined impact magnitudes and number of impacts when the housing impacts a surface, the housing and the mass configured to minimize lateral movement of the mass within the housing;
   wherein the seismic source assembly is fast with the cable, and the actuator is configured selectively to eject the seismic source assembly from the drone under the influence of gravity from a predetermined height to facilitate the mass impacting the housing when the housing impacts the surface after the ejection.

2. The seismic weight dropper arrangement of claim 1, wherein the winch assembly is arranged in signal communication with a controller of the drone, and wherein the controller is able to control the actuator.

3. The seismic weight dropper arrangement of claim 1, wherein the winch assembly is attachable to the drone so that the winch assembly is suspended below the drone to facilitate unimpeded ejection of the seismic source assembly under the influence of gravity.

4. The seismic weight dropper arrangement of claim 1, wherein the actuator comprises an electromechanical actuator for operatively rotating the spool in order to wind the cable onto the spool.

5. The seismic weight dropper arrangement of claim 1, wherein the actuator includes a gearing arrangement to facilitate torque transfer between the actuator and the spool.

6. The seismic weight dropper arrangement of claim 1, wherein the winch assembly comprises a clutch or brake to control rotation of the spool.

7. The seismic weight dropper arrangement of claim 1, wherein the seismic source assembly includes an impact surface at a bottom thereof.

8. The seismic weight dropper arrangement of claim 1, wherein the housing comprises a metallic housing.

9. The seismic weight dropper arrangement of claim 1, wherein the mass comprises a metallic mass.

10. The seismic weight dropper arrangement of claim 1, wherein the housing and the mass are configured by means of shape and dimensions to minimize lateral movement of the mass within the housing.

11. The seismic weight dropper arrangement of claim 1, wherein the resiliently elastic biasing element comprises a spring.

12. The seismic weight dropper arrangement of claim 1, wherein the modulus of elasticity is configured to facilitate repeated impacts of the mass against the housing when the housing impacts the surface.

13. The seismic weight dropper arrangement of claim 1, further comprising a lock assembly configured to releasably and selectively lock the seismic source assembly to the winch assembly.

14. The seismic weight dropper arrangement of claim 13, wherein the lock assembly comprises at least one solenoid lock under control of a controller.

15. A drone configured for seismic surveying, the drone having a controller and comprising the seismic weight dropper arrangement of claim 1, the seismic weight dropper arrangement controlled by the controller.

16. A method of seismic surveying, comprising:
   providing a drone with the seismic weight dropper arrangement of claim 1;
   selectively ejecting the seismic source assembly from the winch assembly when the drone is at a predetermined height above a surface so that the housing impacts the surface; and
   taking seismic measurements.

* * * * *